Figure 1:
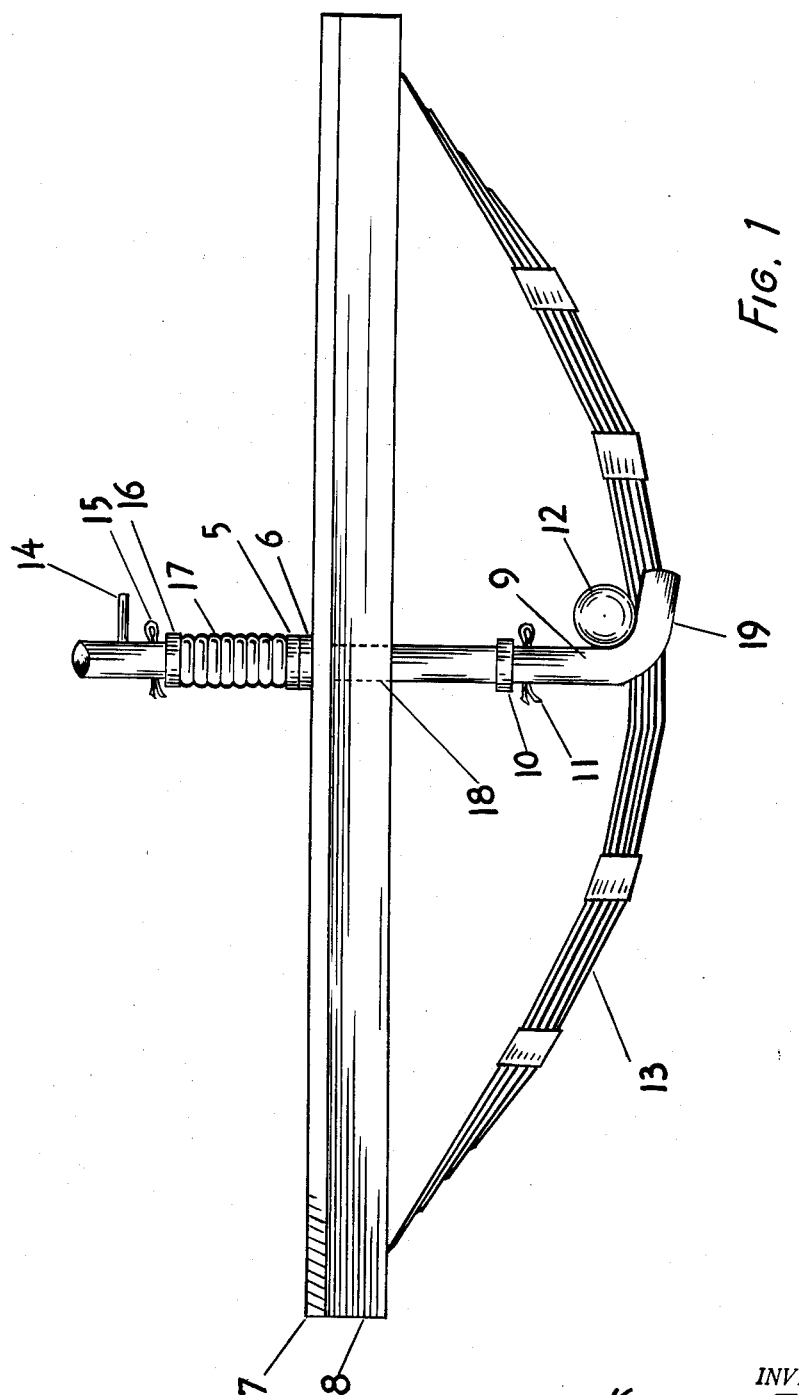

Feb. 21, 1956 K. T. VOGT 2,735,692
VEHICLE SPRING IMMOBILIZING DEVICE
Filed Jan. 9, 1953 2 Sheets-Sheet 1

INVENTOR.
KENNETH T. VOGT
BY Cyrus D. Samuelson
ATTORNEY

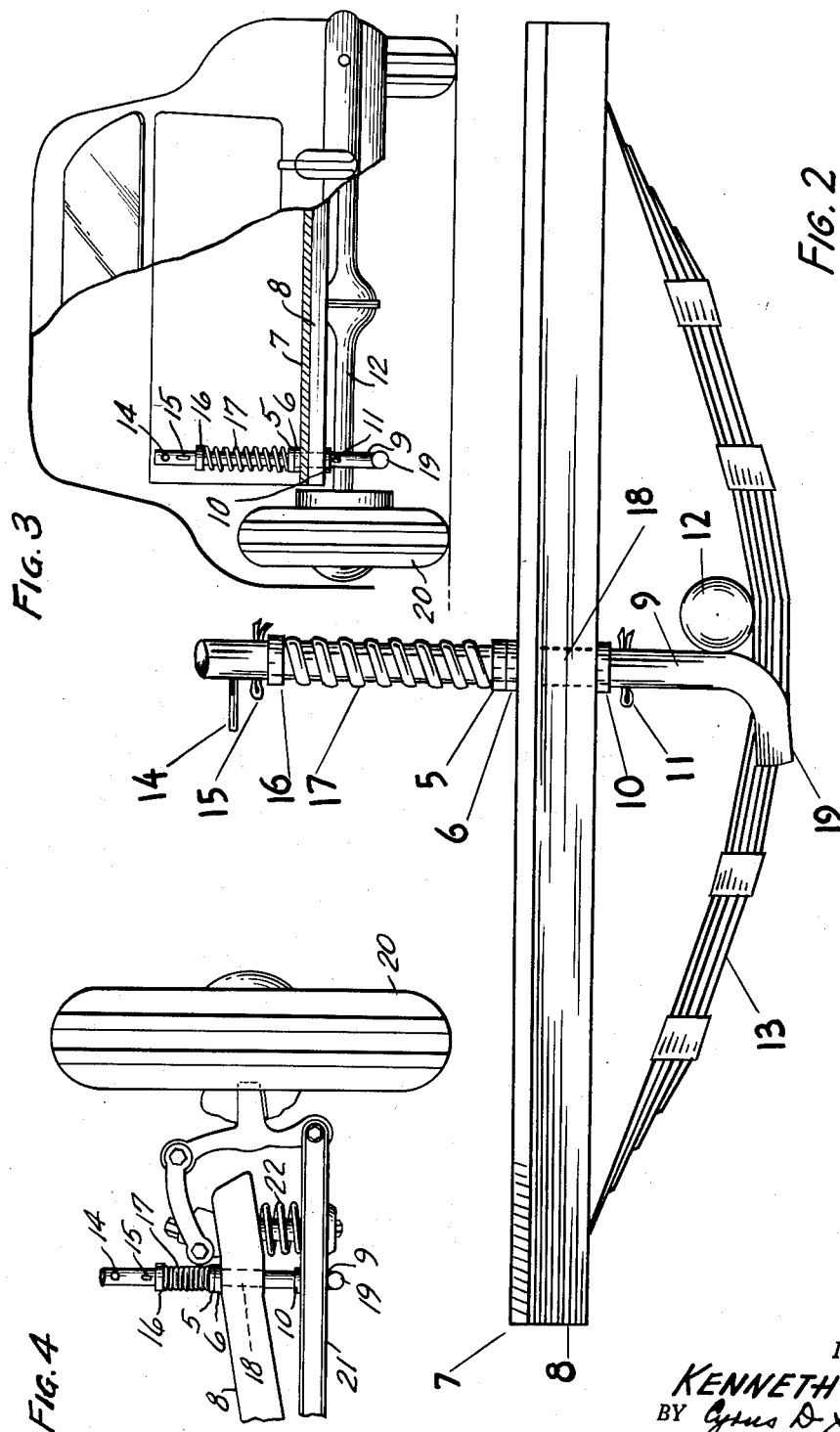

United States Patent Office 2,735,692
Patented Feb. 21, 1956

2,735,692

VEHICLE SPRING IMMOBILIZING DEVICE

Kenneth T. Vogt, Reno, Nev., assignor of fifty per cent to the firm of Samuelson and Johnson, Reno, Nev., a partnership consisting of Norman H. Samuelson and James W. Johnson, Jr., and fifty per cent to Cyrus D. Samuelson, Hackensack, N. J.

Application January 9, 1953, Serial No. 330,448

2 Claims. (Cl. 280—150)

My invention relates to an improved method of jacking up the wheels of automobiles or other vehicles with similar spring suspensions and to suitable apparatus for carrying out the method.

On many present-day automobiles, it is necessary to use a bumper jack to raise the body so as to establish sufficient fender clearance before the axle and wheel assembly is raised. The body design and spring suspension used is often such that it is necessary to raise the body a considerable distance before the axle and wheel assembly is raised enough to permit the wheel to be removed from the vehicle. The various methods of individual wheel spring suspensions, which are used, increase the distance which the body must be raised before the wheel starts to leave the ground during conventional jacking operations.

An object of my invention is to improve the present method of jacking up a vehicle while using a bumper jack so as to overcome the difficulties mentioned.

A further object is to provide suitable apparatus for carrying out the method.

Other objects and advantages of the invention will be apparent during the course of the following description.

In the accompanying drawings, forming a part of this application, and in which like numerals are employed to designate like parts throughout the same, Figure 1 is a view of my invention in the raised or operating position, as used in conjunction with the rear wheels of a vehicle, Figure 2 is a view of my invention in the normal or non-operating position, as used in conjunction with the rear wheels of a vehicle, Figure 3 is a view of my invention in the normal or non-operating position as installed for use in conjunction with the rear wheels of an automobile, And Figure 4 is a view of my invention in the partially raised or operating position as used in conjunction with the front wheels of a vehicle.

In the drawings, wherein for the purpose of illustration is shown a preferred embodiment of my invention, the numeral 9 designates a rod of suitable strength and dimensions, the numeral 7 represents the vehicle body and the numeral 8 designates the vehicle frame. The numeral 10 designates the lower washer which limits the upward movement of rod 9. The numeral 6 designates a washer for sealing out dirt and moisture and the numeral 5 designates a washer for holding in place both washer 6 and the spring designated by numeral 17. Numeral 16 designates the upper washer which holds spring 17 in place. Numeral 15 designates a pin which limits the travel of washer 16; numeral 11 designates a pin which keeps washer 10 in place. Numeral 14 designates the handle which is employed to turn the device. Numeral 12 designates the vehicle axle housing and numeral 13 designates the rear vehicle spring. Numeral 18 designates the holes in the vehicle body and frame through which the rod 9 is inserted. Numeral 19 designates the horizontal portion of the rod 9. Numeral 20 designates the vehicle wheel and numeral 22 designates the front coil spring. Numeral 21 designates the front wheel "A" assembly.

The basic purpose of the invention is to provide a method and means for overcoming the sag of the vehicle spring when jacking up the chassis at any point other than beneath the axle. On modern automobiles, the length of the body beyond the axle is such that the ordinary axle jack cannot be placed under the axle. For this reason the so-called bumper jack was devised and is used. The bumper jack raises the bumper and car body first, but due to the sag of the spring and the force of gravity, the wheel remains on the ground for some time. My invention overcomes a portion of the sag of the vehicle spring and the wheel is raised from the ground much more quickly when it is used in conjunction with a bumper jack. This prevents damage to the springs due to strain and elongation.

The invention consists of a rod 9 of sufficient strength which is inserted through holes 18 in the car body 7 and frame 8. Below the frame 8 a suitable washer 10 of metal or other material of sufficient strength is fitted on rod 9 and is held in place by pin 11. Above the vehicle body 7 a washer 6 of rubber, plastic or other suitable material for excluding dirt and moisture is fitted on rod 9 and is held in place by washer 5 which is similar to washer 10. Spring 17 is placed on rod 9 and is held in place by washers 5 and 16. Pin 15 holds washer 16 in place on rod 9. Handle 14 is used to turn the rod 9 to and from the positions shown in the figures. The horizontal portion 19 of rod 9 is shaped to support the axle housing 12 or the "A" assembly 21 and is of sufficient length to prevent the axle or "A" assembly from slipping off when rod 9 is in the operating positions as shown in Figures 1 and 4.

When the vehicle is being operated normally, the invention is in the position illustrated in Figures 2 and 3. When the vehicle is being raised by means of a bumper jack, the device is placed in the positions illustrated in Figures 1 and 4. To use my invention to raise either of the rear wheels of a vehicle in conjunction with a bumper jack, the jack is placed under the bumper in the usual manner. By means of handle 14, rod 9, which is installed in conjunction with the wheel being raised, is turned 180 degrees from the position shown in Figures 2 and 3 to that shown in Figure 1, so that portion 19 of rod 9 is under axle housing 12 and is at a right angle to axle housing 12. As the frame 8 and the body 7 are raised by a bumper jack, spring 17 is compressed between washers 5 and 16. This permits sufficient fender clearance for wheel removal. When the spring 17 is compressed washer 10 comes in contact with the underside of the frame 8 and limits further upward movement of rod 9. This action raises rod 9 and portion 19 of rod 9 lifts the axle housing 12, thus raising the wheel 20 off the ground. After the wheel 20 has been removed and replaced, the jack is lowered until the wheel 20 rests on the ground. Then rod 9 is returned to the position shown in Figures 2 and 3 by means of handle 14.

My invention is used to raise either front wheel in a manner similar to that just described for raising the rear wheels. Figure 4 illustrates such use, being a view of the invention in a partially operated position. In the fully operated position washer 10 is raised to the underside of frame 8 so as to limit further upward movement of rod 9.

The installation in conjunction with the rear wheels is in the trunk of the vehicle and that in conjunction with the front wheels is under the vehicle hood. There is a separate unit used with each wheel of the vehicle.

It is to be understood that the form of my invention, herewith shown and described, is to be taken as a preferred example of the same, and that various changes in the shape, size and arrangement of parts may be resorted to, without departing from the spirit of my invention or the scope of the subjoined claims.

Having thus described my invention, I claim:

1. A spring immobilizing device for a spring-supported vehicle wheel and axle comprising a rod with a right angle portion at the lower end; said right angle portion being shaped to fit under the axle housing of the vehicle; a spring being mounted on the upper portion of said rod and being held in place by upper and lower containing means; said lower containing means bearing on a substantially rigid portion of the vehicle.

2. A spring immobilizing device for an independently spring-suspended vehicle wheel comprising a rod with a right angle portion at the lower end, said right angle portion being shaped to fit under the wheel supporting assembly; a spring being mounted on the upper portion of said rod and being held in place by upper and lower containing means; said lower containing means bearing on a substantially rigid portion of the vehicle.

References Cited in the file of this patent

UNITED STATES PATENTS

| | | |
|---|---|---|
| 2,413,290 | Carter | Dec. 31, 1946 |
| 2,473,338 | Kilmer | June 14, 1949 |
| 2,568,231 | Grossman | Sept. 18, 1951 |